United States Patent
Martin et al.

(10) Patent No.: US 7,777,455 B1
(45) Date of Patent: Aug. 17, 2010

(54) SWITCHING BATTERY CHARGER WITH PROGRAMMABLE CURRENT CONTROL AND POWER CONTROL

(75) Inventors: Steven Leo Martin, Chelmsford, MA (US); Trevor Wayne Barcelo, Andover, MA (US)

(73) Assignee: Linear Technology Corporation, Milpitas, CA (US)

( * ) Notice: Subject to any disclaimer, the term of this patent is extended or adjusted under 35 U.S.C. 154(b) by 328 days.

(21) Appl. No.: 11/812,417

(22) Filed: Jun. 19, 2007

(51) Int. Cl.
*H02J 7/00* (2006.01)
(52) U.S. Cl. .................. 320/160; 320/137; 363/97
(58) Field of Classification Search ............... 320/140, 320/146, 153, 160, 27, 32, 35, 282–288, 320/299, 272; 363/56.02, 17, 98, 21.13, 363/97; 307/66
See application file for complete search history.

(56) References Cited

U.S. PATENT DOCUMENTS

| | | | | |
|---|---|---|---|---|
| 5,424,936 A | * | 6/1995 | Reddy | 363/97 |
| 5,625,275 A | * | 4/1997 | Tanikawa et al. | 320/160 |
| 5,898,234 A | * | 4/1999 | Kitagawa | 307/48 |
| 6,057,665 A | * | 5/2000 | Herniter et al. | 320/101 |
| 6,169,680 B1 | * | 1/2001 | Matsui et al. | 363/21.05 |
| 6,204,645 B1 | * | 3/2001 | Cullen | 323/223 |
| 6,255,804 B1 | * | 7/2001 | Herniter et al. | 320/137 |

* cited by examiner

*Primary Examiner*—Rajnikant B Patel
(74) *Attorney, Agent, or Firm*—McDermott Will & Emery LLP

(57) ABSTRACT

A switching circuit coupled to one or more input sources and having one or more switching elements controlled to produce an output for charging a battery. A first control circuit is responsive to current of the switching circuit for producing a first control signal to drive the switching element so as to control the current. A second control circuit is responsive to voltage at the battery for producing a second control signal to drive the switching element so as to control voltage developed across the battery. A selector circuit is responsive to the first and second control signals for selectively controlling the switching element.

28 Claims, 1 Drawing Sheet

SWITCHING BATTERY CHARGER WITH PROGRAMMABLE CURRENT CONTROL AND POWER CONTROL

RELATED APPLICATIONS

This application contains subject matter related to copending U.S. application Ser. No. 11/783,957 of Steven L. Martin, entitled "DETERMINING AVERAGE OUTPUT CURRENT IN DC-DC CONVERTER," filed Apr. 13, 2007, and commonly assigned with the present application. The disclosure of that application is incorporated herein.

TECHNICAL FIELD

The subject matter of this disclosure relates to power supply circuits, and more particularly to a mechanism for programmable input and/or output current control and voltage control in a switching circuit, such as a step-down inductive switching regulator, for converting an input from one or more input sources into an output for charging a battery.

BACKGROUND

In portable battery chargers, it may be desirable to have multiple inputs that support available input sources or one input that may be configured in one of different ways to support various applications.

In particular, in multi-input devices, one of the inputs may be configured to limit or otherwise control the total input current drawn from a power source. For example, the power source may be the USB port of a computer which is not permitted to deliver more than a given amount of current. In this case, the battery charger should be able to determine and limit the input current. The output current delivered to the battery would be governed by the input current limit and by the step-down ratio of the inductive switching regulator.

The battery size needs to be sufficiently large to receive all of the available but limited input power. For example, in a 2.5 W USB mode (5V @ 500 mA), the available battery charge current may be as high as (5.5V/2.8V)×500 mA or approximately 1 A. Only batteries capable of being charged at that rate would qualify for this system.

For supporting other input sources, it may be desirable to limit or otherwise control the output current of a switching regulator (i.e. the battery current itself), instead of limiting the input current. For example, such input source as a 5V regulated wall adapter is capable of delivering any amount of current defined by a battery current limit. Input current would be governed only by the step-down ratio of the inductive switching regulator.

In a single-input battery charger, it would be desirable to configure the input pin in accordance with a user request to support any available input source.

Also, it would be desirable to automatically limit voltage developed across the battery. For example, in applications using an input source whose current must be limited, an additional mechanism for limiting voltage developed across the battery would provide the absolute maximum charge current.

Therefore, there is a need for a switching battery charger capable of accurately determining the average input current as well as the average output current of an inductor-based converter, and to use this information for controlling input and/or output current.

Moreover, in accordance with a conventional technique, input or output current may be directly sensed using a current sensing resistor. However, the conventional current sensing resistor is large in physical size. Therefore, it occupies substantial space on a circuit board increasing the cost of a converter and causing significant power loss. Accordingly, it would be desirable to determine the input and/or output current without the use of a current sensing resistor.

Finally, there is a need for circuitry and methodology that would combine controlling input and/or output current as described above with limiting voltage developed across a battery for the purpose of charging it under controlled conditions.

SUMMARY OF THE DISCLOSURE

In accordance with one aspect of the present disclosure, a switching circuit for receiving an input current and producing an output current to charge a battery is configured to control either the input current or the output current. The switching circuit comprises a power switching element, and a first control circuit selectively responsive to the input current if the input current is controlled or to the output current if the output current is controlled, for producing a first control signal to drive the switching element so as to control the input current or the output current. For example, the switching circuit may be a buck DC-DC converter.

A second control circuit may be responsive to a voltage at the battery for producing a second control signal to drive the switching element so as to control voltage developed across the battery. A selector circuit may be responsive to the first and second control signals for selectively controlling the switching element.

A mode control circuit may configure the switching circuit to selectively control either the input current or the output current.

The first control signal may include a first pulse width modulation (PWM) signal for controlling a duty cycle of the power switching element and the second control signal includes a second PWM signal for controlling the duty cycle of the power switching element.

The selector circuit may control the power switching element in response to the first control signal if the first control signal is applied before or is otherwise predominant over the second control signal, and in response to the second control signal if the second control signal is applied before or is otherwise predominant over the second control signal.

A current determining output may be provided for determining average current of the switching circuit over one or more switching cycles of the switching circuit. In response to the mode control circuit, the current determining output may selectively produce a signal corresponding either to an average input current or to an average output current.

In accordance with another aspect of the disclosure, a switching circuit for converting an input voltage into an output voltage comprises an input node for receiving the input voltage, and a power switching element coupled to the input node and controllable to adjust the output voltage using a current sense element representing current in an inductor element connectable to the power switching element.

A current generator is responsive to a voltage at the output of the power switching element to produce representation of an average value of the inductor current over one or more switching cycle of the power switching element.

A current determining circuit configured to selectively operate in an input current determining mode and in an output current determining mode is responsive to the average value of the inductor current for producing an input current signal proportional to an average input current of the switching circuit over one or more switching cycles in the input current determining mode, and for producing an output current signal proportional to an average output current of the switching circuit over one or more switching cycles in the output current determining mode.

In accordance with an embodiment of the disclosure, the current generator may include an average and hold circuit responsive to the voltage at the output of the power switching element for producing an average switch voltage during the time when the power switching element is on.

The average and hold circuit may include:
a first switching element responsive to the output of the power switching element and operating in phase with the power switching element, and
an RC circuit coupled to an output of the first switching element.

The current generator may further comprise a voltage-to-current converter responsive to the average switch voltage during the time when the power switching element is on for producing a signal representing the average value of the inductor current.

The voltage-to-current converter may include:
a sense element coupled to the input node and having resistance proportional to the resistance of the power switching element when the power switching element is on,
an operational amplifier having a first input responsive to the average switch voltage when the power switching is on and a second input coupled to the sense element, and
a driver coupled to the output of the operational amplifier for supplying an output of the operational amplifier to the sense element and conveying information about the current in the sense element.

The current determining circuit may comprise a second switching element coupled to the driver. In the input current determining mode, the second switching element is switched in phase with the power switching element. In the output current determining mode, the second switching element continuously connects the driver to a current determining node.

The switching circuit may further comprise:
a first control circuit responsive to current determined by the current determining circuit for producing a first control signal to drive the switching element so as to control either the average input current or the average output current,
a second control circuit responsive to voltage at a battery charged by the switching circuit for producing a second control signal to drive the switching element so as to control the voltage developed across the battery, and
a selector circuit responsive to the first and second control signals for selectively controlling the switching element.

In accordance with a further aspect of the disclosure, a switching circuit for charging a battery comprises a first node for receiving a first input, a second node for receiving a second input, a first current determining output configured for producing a first current signal in response to the first input, a second current determining output configured for producing a second current signal in response to the second input, a first power switching element controllable for adjusting an output in response to the first input, and a second power switching element controllable for adjusting the output in response to the second input.

A first control circuit is responsive to the first and second current signals for producing a first control signal to drive the first and second switching elements so as to control current, and a second control circuit is responsive to voltage at the battery for producing a second control signal to drive the first and second switching elements so as to control the voltage developed across the battery.

The first current determining output may be configured for producing an input current signal corresponding to an input current at the first input, and the second current determining output may be configured for producing an output current signal corresponding to an output current of the switching circuit produced in response to the second input.

Alternatively, the first current determining output may be configured for producing an input current signal corresponding to an input current at the first input, and the second current determining output may be configured for producing another input current signal corresponding to an input current at the second input.

Also, the first current determining output may be configured for producing an output current signal corresponding to an output current of the switching circuit produced in response to the first input, and the second current determining output may be configured for producing another output current signal corresponding to an output current of the switching circuit produced in response to the second input.

In accordance with a method of the present disclosure, the following steps are carried out for converting an input into an output to charge a battery using a switching circuit having one or more power switching elements controlled to adjust the output:
in response to a current in the switching circuit, producing a first control signal to drive the switching element so as to control the current,
in response to a voltage at the battery, producing a second control signal to drive the switching element so as to control the voltage developed across the battery, and
selectively controlling the switching element by the first control signal or the second control signal.

In a first mode of operation, the first control signal may be produced in response to an input current signal representing an input current of the switching circuit.

In a second mode of operation, the first control signal may be produced in response to an output current signal representing an output current of the switching circuit.

The power switching element may be controlled by the first control signal if this signal is produced before or is otherwise predominant over the second control signal, and by the second control signal if this signal is produced before or is otherwise predominant over the first control signal.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a battery charger including a buck inductive switching regulator. It will become apparent, however, that the concept of the disclosure is applicable to any power converter.

Figure 1:
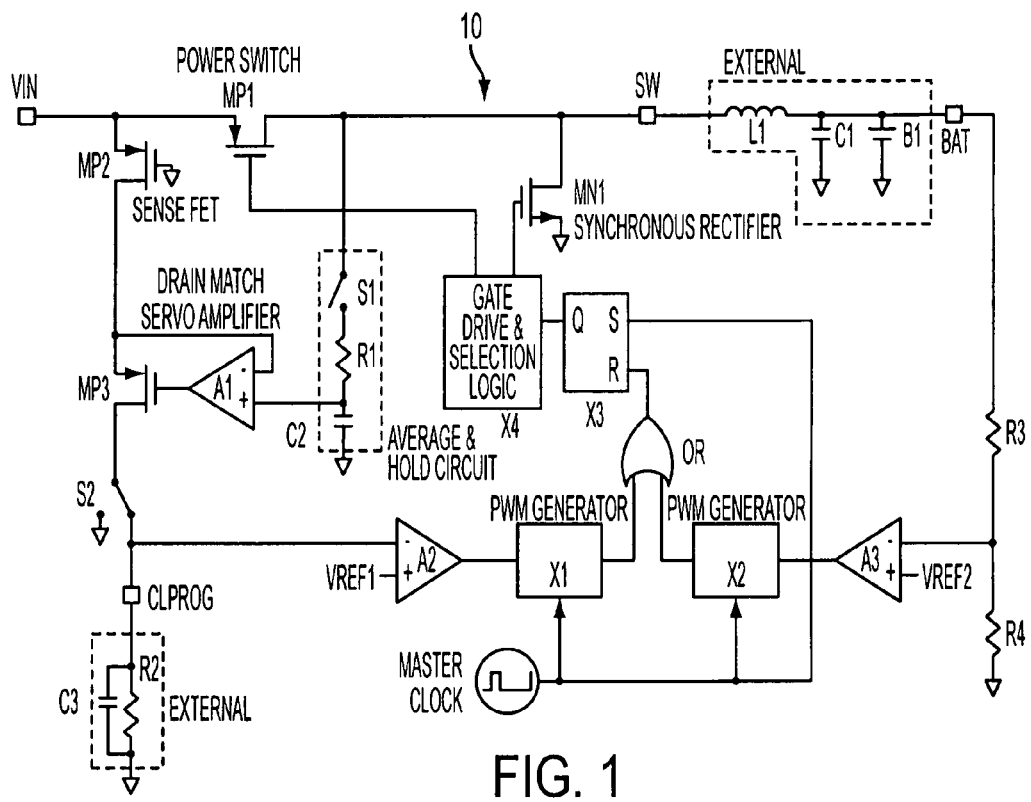
FIG. 1 schematically illustrates an exemplary single-input battery charger of the present disclosure, and FIG. 2 schematically illustrates an exemplary multi-input battery charger of the present disclosure.

As shown in FIG. 1, a single-input exemplary battery charger 10 of the present disclosure comprises an input node VIN connectable to a power source for receiving an input voltage VIN. For example, the battery charger 10 may be connected to such power sources as a USB port or a wall adapter. The battery charger 10 includes a CMOS buck switching regulator that delivers power to a battery B1. The switching regulator includes a power switch MP1 coupled to the VIN node. The power switch may be a field-effect transistor (FET) switch implemented using a PMOS transistor.

An inductor L1 and capacitor C1 are coupled to the drain of MP1 to deliver power to the battery B1. These elements may be coupled to a switch output pin SW of the buck regulator chip and arranged externally with respect to this chip. The power switch MP1 alternately connects and disconnects the input pin to and from the inductor L1. A synchronous rectifier MN1 may be arranged in the power delivery path to increase efficiency of power conversion. The synchronous rectifier may include a FET switch such as an NMOS transistor. Alternatively, a diode may be provided instead of the synchronous rectifier.

When the power switch MP1 is on, i.e. closed, the synchronous rectifier MN1 is off, i.e. open, and the input voltage VIN is applied to the inductor L1. The difference between the input and output voltages is then forced across the inductor L1 causing current through the inductor to increase. During the on-time of the power switch MP1, the inductor current charges the capacitor C1 and the battery B1.

When the power switch MP1 is off, the synchronous rectifier MN1 is on, and the input voltage applied to the inductor L1 is removed. However, since the current in the inductor L1 can not change instantly, the voltage across the inductor L1 adjusts to hold the inductor current constant. The inductor current flows through the battery B1 and back through the synchronous rectifier MN1. The capacitor C1 discharges into the battery B1 contributing to the total current being supplied to the battery B1.

Hence, the inductor current ramps up when the power switch MP1 is on, and ramps down when the power switch MP1 is off. Due to a triangular waveform of the inductor current, the average value of the inductor current during its rising period is equal to the average value of the inductor current during its falling period. The buck regulator may operate in a continuous conduction mode and its inductor current is always positive, i.e. current is always flowing into the battery B1.

As discussed in more detail below, the topology of the battery charger 10 exploits that the average value of the inductor current during its rising period is equal to the average value of the inductor current during its falling period. The battery charger 10 may use the on-resistance of the power switch MP1 to detect the inductor current, and a proper modulation technique to send a representation of either the input current or the output current to a precision sense resistor.

In particular, the battery charger 10 may include an average and hold circuit coupled to the drain of the FET power switch MP1 and composed of switch S1, resistor R1 and capacitor C2. The switch S1 is controlled to operate in phase with the power switch MP1. The average and hold circuit senses the voltage on the drain of MP1 during the time when the power switch MP1 is on. Since the switch S1 is on only when MP1 is on, the switch voltage produced at the output of MP1 is rejected when its value is low, i.e. when the synchronous rectifier is on. Therefore, the difference between the input voltage VIN and the voltage on the hold capacitor C2 represents the average inductor current during the power switch on-time multiplied by the resistance of the power switch MP1 when MP1 is on. Hence, an average switch voltage during the on time of the power switch MP1 is developed at the output of the average and hold circuit.

Further, the battery charger 10 includes a voltage-to-current converter responsive to the average switch voltage at the output of the average and hold circuit for producing representation of an average inductor current over the switching cycle of the power switch MP1. The voltage-to-current converter may include a drain match servo amplifier and a current sensing element. PMOS transistor MP2 having a source connected to the input node VIN of the buck converter 10 may be used as the current sensing element. The drain match servo amplifier may be composed of operational amplifier A1 and PMOS transistor MP3. A non-inverting input of the operational amplifier A1 may be coupled to the output of the average and hold circuit, whereas an inverting input of A1 may be connected to the drain of MP2 coupled to the source of MP3. The output of A1 may be connected to the gate of MP3.

The current sensing transistor MP2 may be configured to have resistance accurately representing the resistance of the transistor MP1 when MP1 is on. Such an arrangement makes it possible to determine the inductor current using the resistance of the power switch MP1, without an additional current sensing resistor. In particular, the transistor MP2 may be a scaled version of MP1 configured so as to make a current flowing through MP2 equal to a precise fraction of the current that flows through MP1 when MP1 is on. For example, MP2 may be designed to have 5,000 times the resistance of MP1 when MP1 is on.

The drain match servo amplifier, in conjunction with MP3, impresses the voltage at the output of the average and hold circuit on the drain of MP2. The transistors MP1 and MP2 may be fabricated on the same chip and may have the same gate potential as MP1 when MP1 is on. Therefore, the ratio between their currents when transistor MP1 is on may be accurately controlled. Hence, the current flowing in MP2 and MP3 may be a scaled replica of the current in switch MP1 and therefore the inductor L1 averaged over the period when the power switch MP1 is on. As discussed above, the inductor current has a triangular waveform. Therefore, the current in the drain of the transistor MP3 is directly proportional to the average inductor current over one or more switching cycles of the power switch MP1.

The average and hold circuit provides filtering of the signal at the output of the power switch MP1. Amplifier A1 maintains a closed loop during the entire switching cycle of MP1 and responds only to frequency components below the cutoff frequency of an RC circuit composed of the resistor R1 and capacitor C2. Therefore, the current supplied from the drain of MP3 is a slower signal having very low content of switching frequency components The drain of MP3 is connected to a single-pole double-throw switch S2 which may be controlled to operate in phase with the power switch MP1. The switch S2 may steer the current from the drain of MP3 to either a current limit programming pin CLPROG or ground. In particular, when the power switch MP1 is on, the switch S2 is controlled to connect the drain of MP3 to the CLPROG pin. When the power switch MP1 is off, the switch S2 is controlled to connect the drain of MP3 to ground. Hence, the average current sent to the CLPROG pin may be a precise fraction of the input current pulled from the input node VIN.

Therefore, by way of duty cycle modulation, the switch S2 allows a representation of the average inductor current to be converted into a representation of the input current. The same configuration of the battery charger 10 enables a user to determine the average output current at the CLPROG pin, instead of the average input current. Accordingly, the battery charger 10 may operate in an input current determining mode to control the input current or in an output current determining mode to control the output current, i.e. the current delivered to the battery B1.

In particular, in the output current determining mode, the switch S2 may be controlled to permanently connect the drain of MP3 to the CLPROG pin during the entire switching cycle of the power switch MP1, rather than switched in phase with the power switch MP1, as in the input current determining mode. Hence, in the output current determining mode, a signal at the CLPROG pin represents the inductor current during the entire switching cycle of the power switch MP1. As the average value of the inductor current during its rise time is equal to the average value of the inductor current during its fall time, the signal at the CLPROG pin represents the average output current of the battery charger 10. Hence, the switch S2 may be controlled to enable the operation of the battery charger 10 in either the input current determining mode or the output current determining mode. Accordingly, the signal at the CLPROG pin may represent either the average input current or the average output current of the battery charger 10.

The ability to select between the input current determining mode and the output current determining mode is especially useful for portable battery charging applications that have a single common input connector supporting USB power sources with limited current capability or specifications requiring limited current delivery, as well as DC wall adapters capable of providing higher currents. If the USB power source is used, the user may configure the battery charger 10 to operate in the input current determining mode to limit the input current. If the DC wall adapter is connected, the user may configure the battery charger 10 to operate in the output current determining mode to limit the current delivered to the battery B1. A user may be enabled to supply the battery charger 10 with a configuration control signal to select between the configuration that supports the input current determining mode and the configuration that supports the output current determining mode. For example, an I²C command or a logic control signal may be used to control the switch S2 to select the configuration of the battery charger 10.

Resistor R2 may be connected to the CLPROG pin to produce a desired voltage value proportional to the average input or output current delivered to the CLPROG pin. The current supplied from the switch S2 is pulsatile. Therefore, averaging capacitor C3 may be connected to the CLPROG pin to filter the current and make the CLPROG voltage essentially a DC signal. The resistor R2 and capacitor C3 may be external components selected by a user to define both the sensitivity and the accuracy of the circuit for determining the average input or output current.

The voltage representing the input or output current determined at the CLPROG pin may be applied to an inverting input of an operational amplifier A2 that compares this voltage with a reference voltage VREF1 set at the non-inverting input of A2 to provide a desired limit of the input or output current. The error signal generated by the operational amplifier A2 may be fed into a pulse-width modulation (PWM) circuit X1 that may provide appropriate control of the power switch MP1 to limit the maximum input or output current of the battery charger 10.

An operational amplifier A3 may be coupled to the battery node BAT via a resistor divider composed of resistors R3 and R4 to sense the voltage on the battery. The sensed battery voltage may be applied to the inverting input of the amplifier A3 that compares it with a reference voltage VREF2 applied to the non-inverting input of A3. For example, the reference voltage VREF2 may be set to provide a desired level of the float voltage at the battery B1, i.e. the voltage on the battery required to maintain a full charge in the battery. The desired float voltage may depend on battery type and configuration. The error signal produced by the amplifier A3 may be supplied to a PWM circuit X2 that may provide appropriate control of the power switch MP1 to limit voltage developed across the battery from the battery charger 10 as the desired float voltage is reached.

PWM signals generated by the PWM circuits X1 and X2 may be applied to respective inputs of a logic gate OR having the output coupled to the reset (R) input of an SR flip-flop circuit X3. The set (S) input of the circuit X3 may be supplied with a master clock that controls the PWM generators X1 and X2. The Q output of the circuit X3 is coupled to a gate drive and selection logic circuit X4 that controls the gates of the power switch MP1 and the synchronous rectifier MN1.

Hence, the PWM generators X1 and X2 selectively control the duty cycle of the power switch MP1 in response to the input or output current of the battery charger 10, or in response to the voltage on the battery B1. In particular, if the PWM signal of X2 produced when the battery voltage reaches the desired float voltage is generated before the PWM signal of X1 produced when the input or output current of the battery charger 10 reaches a desired limit, the OR gate passes the signal of X2 to the R input of the SR flip-flop circuit X3 to reset the power switch MP1 set by the master clock. Simultaneously, the synchronous rectifier MN1 may be set. However, if the PWM signal of X1 is generated before the PWM signal of X2, the power switch MP1 is reset in response to the signal of X1.

Accordingly, if the desired float voltage is reached before the input or output current reaches its desired limit, the battery charger 10 limits the voltage developed across the battery B1 as the float voltage is reached. However, if the desired limit of the input or output current is reached before the desired float voltage, the battery charger 10 provides limiting of the input or output current. The battery charger 10 that combines a current limiting mechanism with a mechanism for limiting voltage developed across the battery may provide the maximum possible charge current to the battery as described in U.S. Pat. No. 6,522,118.

As one skilled in the art would realize, a combination of current and voltage control of the present disclosure may also be implemented in an analog fashion. Also, the power switch may be controlled using a single PWM generator.

Figure 2:
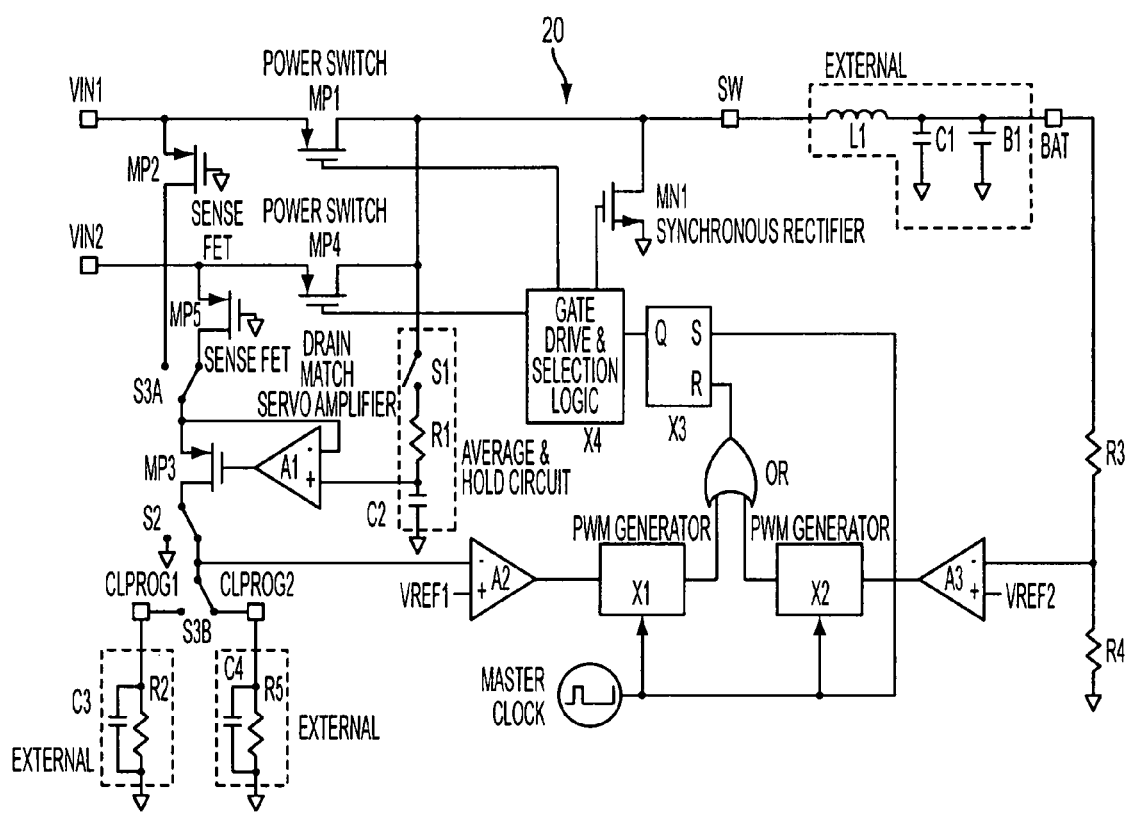

FIG. 2 illustrates another exemplary embodiment of the present disclosure, in which a battery charger has multiple inputs. For example, a battery charger 20 may have inputs VIN1 and VIN2. One of these inputs may be intended to support a USB power source requiring average input current control, and the other may be intended for connection to a regulated wall adapter power source in which ample power is available and direct battery current control is required. The battery charger 20 may have separate power switch, current sensing element and current limit programming pin CLPROG for each input. Hence, in addition to the circuit elements shown in FIG. 1, the battery charger 20 may have power switch MP4, current sensing element MP5 and current limit programming pin CLPROG2 associated with the second input VIN2.

The power switch MP1 is coupled to the first input VIN1 for regulating an output signal for charging the battery B1 in response to the input voltage VIN1 from a power source connected to the input VIN1. The current sensing element MP2 is coupled to the first input VIN1 and has resistance accurately representing the resistance of the transistor MP1 when MP1 is on. In a similar way, the power switch MP4 is coupled to the second input VIN2 for regulating an output signal for charging the battery B1 in response to the input voltage VIN2 from a power source connected to the input VIN2. The current sensing element MP5 is coupled to the second input VIN2 and has resistance accurately representing the resistance of the transistor MP4 when MP4 is on.

Also, the battery charger 20 has current limit programming pins CLPROG1 and CLPROG2 associated with respective inputs VIN1 and VIN2. Programming resistor R2 and capacitor C3 are connected to the CLPROG1 pin, whereas programming resistor R5 and capacitor C4 are coupled to the CLPROG2. Resistors R2 and R5 are selectable to produce desired voltage values proportional to the average input or output current delivered to the CLPROG1 pin and CLPROG2 pin, respectively. Capacitors C3 and C4 may filter the current and make the respective voltages at the CLPROG1 and CLPROG2 pins essentially DC signals. The resistors R2, R5 and capacitors C3 and C4 may be external components selected by a user to define both the sensitivity and the accuracy of the respective circuit for determining the average input or output current.

Selection switches S3A and S3B are provided for selection between inputs VIN1 and VIN2. In particular, when the input VIN1 is selected, the selection switch S3A connects the source of the PMOS transistor MP3 to the drain of the sense PMOS transistor MP2, and the switch S3B connects the CLPROG1 pin to the switch S2 and amplifier A2. When the input VIN2 is selected, the selection switch S3A connects the source of the PMOS transistor MP3 to the drain of the sense PMOS transistor MP5, and the switch S3B connects the CLPROG2 pin to the switch S2 and amplifier A2.

After the input selection is made, the battery charger 20 operates in the manner similar to operation of the battery charger 10 described above. The switch S2 may be configured to operate in a current determining mode appropriate for the selected input power source. For example, if the input VIN1 is selected, and an input power source connected to the input VIN1 requires limited average input current, the switch S2 may be controlled to connect MP3 to CLPROG1 through S3B when MP1 is on in and connect MP3 to the ground when MP1 is off, in order to determine and limit the average input current. Alternatively, if the input VIN2 is selected, and only output current limit is required when power is delivered from a power source connected to the VIN2, the switch S2 may be controlled to permanently connect CLPROG2 to the transistor MP3 via the switch S3B in order to determine and limit the average output current.

Accordingly, the two-input battery charger 20 is able to provide multiple combinations of current control modes. In particular, the battery charger 20 may support average input current control or average output current control for input VIN1, and average input current control or average output current control for input VIN2.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A switching circuit for receiving an input current and producing an output current to charge a battery, the switching circuit being configured to control either the input current or the output current, the switching circuit comprising:
   a power switching element,
   a current sensing element for sensing current in the power switching element when the power switching element is on,
   a current determining circuit for determining an average value of the input current based on the sensed current if the input current is controlled, and for determining an average value of the output current based on the sensed current if the output current is controlled, and
   a first control circuit selectively responsive to the determined average value of the input current if the input current is controlled, or to the determined average value of the output current if the output current is controlled, for producing a first control signal to drive the power switching element so as to control the input current or the output current.

2. The switching circuit of claim 1, further comprising a second control circuit responsive to a voltage at the battery for producing a second control signal to drive the switching element so as to control voltage developed across the battery.

3. The switching circuit of claim 2, further comprising a selector circuit responsive to the first and second control signals for selectively controlling the switching element.

4. The switching circuit of claim 3, wherein the first control signal includes a first pulse width modulation (PWM) signal for controlling a duty cycle of the power switching element and the second control signal includes a second PWM signal for controlling the duty cycle of the power switching element.

5. The switching circuit of claim 3, wherein the selector circuit is configured to control the power switching element in response to the first control signal if the first control signal is applied before or is otherwise predominant over the second control signal, and in response to the second control signal if the second control signal is applied before or is otherwise predominant over the second control signal.

6. The switching circuit of claim 1, further comprising a mode control circuit for configuring the switching circuit to selectively control either the input current or the output current.

7. The switching circuit of claim 6, further comprising at least one current determining output for determining average current of the switching circuit over one or more switching cycles of the switching circuit.

8. The switching circuit of claim 7, wherein the current determining output is responsive to the mode control circuit to selectively produce a signal corresponding either to an average input current or to an average output current.

9. The switching circuit of claim 8, further comprising multiple inputs.

10. The switching circuit of claim 9, wherein multiple current determining outputs are providing for determining current at respective inputs.

11. The switching circuit of claim 10, wherein one of the multiple current determining outputs is responsive to the mode control circuit to produce a first signal corresponding to an average input current at one of the inputs, and another current determining output is responsive to the mode control signal to produce a second signal corresponding to the average output current of the switching circuit.

12. The switching circuit of claim 1 comprising a converter for converting an input DC voltage into an output DC voltage reduced compared to the input DC voltage.

13. A switching circuit for converting an input voltage into an output voltage, comprising:
   an input node for receiving the input voltage,
   a power switching element coupled to the input node and controllable to adjust the output voltage using a sense element representing current in an inductor element connectable to the power switching element,
   a current generator responsive to a voltage at the output of the power switching element to produce a representation of an average value of the inductor current over one or more switching cycles of the power switching element, and
   a current determining circuit configured to selectively operate in an input current determining mode and in an output current determining mode,
   the current determining circuit being responsive to the average value of the inductor current for producing an input current signal proportional to an average input current of the switching circuit over one or more switching cycles in the input current determining mode, and for producing an output current signal proportional to an average output current of the switching circuit over one or more switching cycles in the output current determining mode.

14. The circuit of claim 13, wherein the current generator includes an average and hold circuit responsive to the voltage at the output of the power switching element for producing an average switch voltage when the power switching element is on.

15. The converter of claim 14, wherein the average and hold circuit includes a first switching element responsive to the output of the power switching element and operating in phase with the power switching element.

16. The converter of claim 15, wherein the average and hold circuit further comprises an RC circuit coupled to an output of the first switching element.

17. The converter of claim 16, wherein the current generator further comprises
   a voltage-to-current converter responsive to the average and hold circuit for producing a signal representing the average value of the inductor current.

18. The converter of claim 17, wherein the voltage-to-current converter comprises a sense element coupled to the input node and having resistance proportional to the resistance of the power switching element when the power switching element is on.

19. The switching circuit of claim 18, wherein the voltage-to-current converter further comprises an operational amplifier having a first input responsive to the average and hold circuit and a second input coupled to the sense element.

20. The switching circuit of claim 19, wherein the voltage-to-current converter further comprises a driver coupled to the output of the operational amplifier for supplying an output of the operational amplifier to the sense element and conveying a current in the sense element.

21. The switching circuit of claim 20, wherein the current determining circuit comprises a second switching element coupled to the driver.

22. The switching circuit of claim 21, wherein the second switching element is switched in phase with the power switching element in the input current determining mode.

23. The switching circuit of claim 22, wherein the second switching element connects the driver to a current determining node in the output current determining mode.

24. The switching circuit of claim 13, further comprises:
   a first control circuit responsive to current determined by the current determining circuit for producing a first control signal to drive the switching element so as to control the current,
   a second control circuit responsive to voltage at a battery charged by the switching circuit for producing a second control signal to drive the switching element so as to control voltage developed across the battery, and
   a selector circuit responsive to the first and second control signals for selectively controlling the switching element.

25. A switching circuit for charging a battery, comprising:
   a first node for receiving a first input,
   a second node for receiving a second input,
   a first current determining output configured for producing a first current signal in response to the first input,
   a second current determining output configured for producing a second current signal in response to the second input,
   a first power switching element controllable for adjusting an output in response to the first input,
   a second power switching element controllable for adjusting the output in response to the second input,
   a first control circuit responsive to the first and second currents signals for producing a first control signal to drive the first and second switching elements so as to control current, and
   a second control circuit responsive to voltage at the battery for producing a second control signal to drive the first and second switching elements so as to control voltage developed across the battery.

26. The switching circuit of claim 25, wherein the first current determining output is configured for producing a first input current signal corresponding to an input current at the first input, and the second current determining output is configured for producing a second output current signal corresponding to an output current of the switching circuit produced in response to the second input.

27. The switching circuit of claim 25, wherein the first current determining output is configured for producing a first input current signal corresponding to an input current at the first input, and the second current determining output is configured for producing a second input current signal corresponding to an input current at the second input.

28. The switching circuit of claim 25, wherein the first current determining output is configured for producing a first output current signal corresponding to an output current of the switching circuit produced in response to the first input, and the second current determining output is configured for producing a second output current signal corresponding to an output current of the switching circuit produced in response to the second input.

* * * * *